United States Patent [19]

Pawlewski et al.

[11] Patent Number: 5,583,961
[45] Date of Patent: Dec. 10, 1996

[54] SPEAKER RECOGNITION USING SPECTRAL COEFFICIENTS NORMALIZED WITH RESPECT TO UNEQUAL FREQUENCY BANDS

[75] Inventors: Mark Pawlewski, Ipswich; Joseph G. Tang, Kingston Upon Thames, both of England

[73] Assignee: British Telecommunications public limited company, London, England

[21] Appl. No.: 105,583

[22] Filed: Aug. 13, 1993

[30] Foreign Application Priority Data

Mar. 25, 1993 [GB] United Kingdom ................ 93302302

[51] Int. Cl.$^6$ .............................. G10L 5/06; G10L 9/00
[52] U.S. Cl. ...................... 395/2.5; 395/2.51; 395/2.52; 395/2.14
[58] Field of Search ...................... 381/42, 43; 395/2.5, 395/2.51, 2.52, 2.43

[56] References Cited

U.S. PATENT DOCUMENTS 4,829,578  5/1989  Roberts ................................. 381/46

OTHER PUBLICATIONS

Parsons, *Voice and Speech Processing*, McGraw–Hill, 1986, p. 73.

Naik et al, "Speaker Verification over Long Dist. Telephone Lines", ICASSP 89, vol. 1, 23 May 1989, Glasgow, pp. 524–527.

Furui, "Speaker Recognition by Statistical Features and Dynamic Features", Rev. of the Electrical Comm. Labs, vol. 30, No. 3, 1982, Tokyo, pp. 467–482.

Ney et al, "An Automatic System for Verification of Cooperative Speakers Via Telephone", 1981 Carnaham Conference On Crime Countermeasures, 13 May 1981, Lexington, pp. 97–101.

Chollet et al, "On the Evaluation of Speech Recognizers and Data Bases Using a Reference System", ICASSP 82, vol. 3, 3 May 1982, Paris, pp. 2026–2029.

Acero et al, "Environmental Robustness In Automatic Speech Recognition", Department of Electrical and Computer Engineering and School of Computer Science, Carnegie Mellon University, 1990 IEEE, pp. 849–852.

Atal, "Effectiveness of Linear Prediction Characteristics of the Speech Wave for Automatic Speaker Identification and Verification", J. Acoust. Soc. Am., vol. 55, No. 6, Jun. 1974, pp. 1304–1312.

Lerner et al, "Telephone Channel Normalization for Automatic Speech Recognition", 1992 IEEE, Solomon Lerner and Baruch Mazor GTE Laboratories, Inc., pp. I–261–I–264.

Hermansky et al, "Rasta–PLP Speech Analysis Technique", 1992 IEEE, pp. I–121–I–264.

Furui et al, "Cepstral Analysis Technique for Automatic Speaker Verification", IEEE Transactions On Acoustics, Speech, And Signal Processing, vol. ASSP–29, No. 2, Apr. 1981, pp. 254–272.

Soong et al, "On the Use of Instantaneous and Transitional Spectral Information in Speaker Recognition", IEEE Transactions On Acoustics, Speech, And Signal Processing, vol. 36, No. 6, Jun. 1988, pp. 871–879.

Chollet et al, "On the Evaluation of Speech Recognizers and Data Bases Using a Reference System", IEEE, 1982, pp. 2026–2029.

*Primary Examiner*—Allen R. MacDonald
*Assistant Examiner*—Indranil Chowdhury
*Attorney, Agent, or Firm*—Nixon & Vanderhye P.C.

[57] ABSTRACT

Apparatus and method for speaker recognition includes generating, in response to a speech signal, a plurality of feature data having a series of coefficient sets, each set having a plurality of coefficients indicating the short term special amplitude in a plurality of frequency bands. The feature data is compared with predetermined speaker reference data, and recognition of a corresponding speaker is indicated in dependence upon such comparison. The frequency bands are unevenly spaced along the frequency axis, and a long term average spectral magnitude of at least one of said coefficients is derived and used for normalizing the at least one coefficient.

49 Claims, 8 Drawing Sheets

POWER

FREQUENCY   1KHz x

=

Σ

Mo  Mi

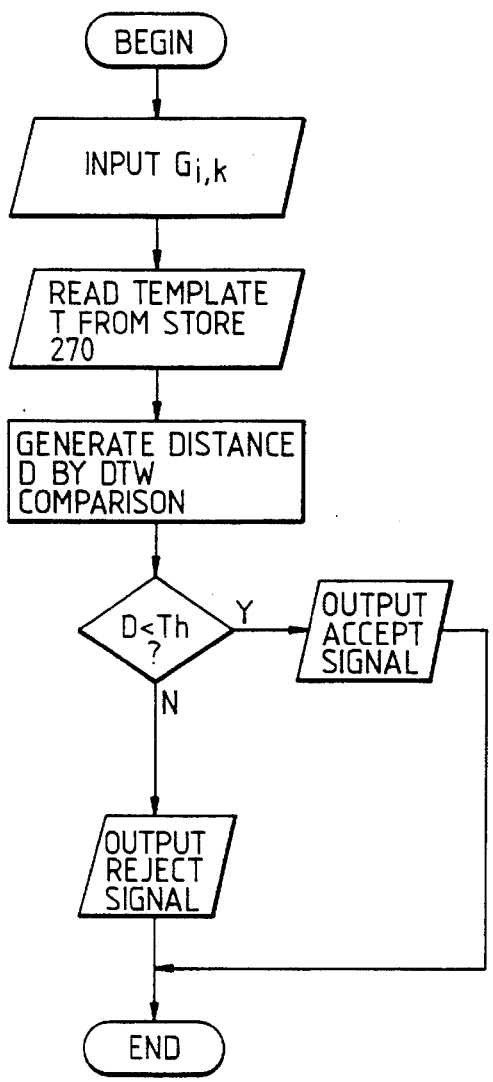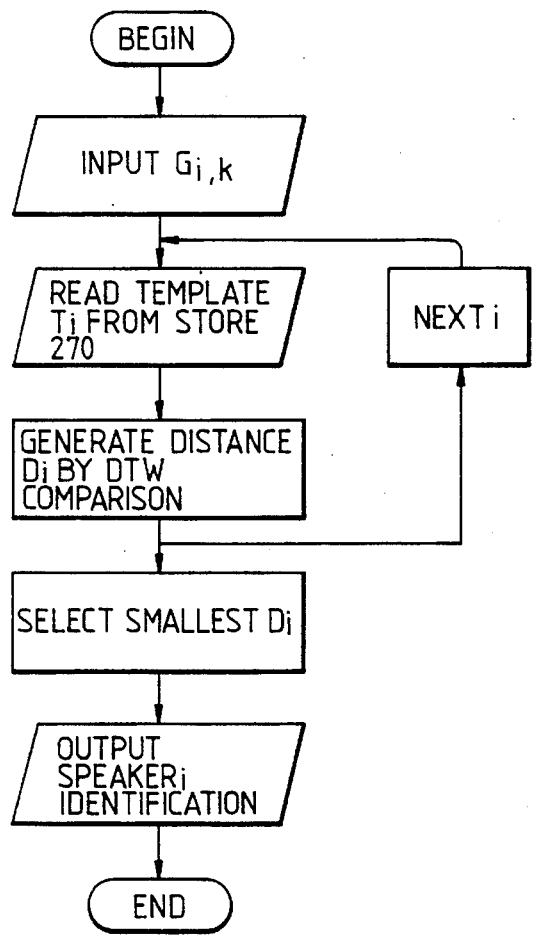

SPEAKER RECOGNITION USING SPECTRAL COEFFICIENTS NORMALIZED WITH RESPECT TO UNEQUAL FREQUENCY BANDS

BACKGROUND OF THE INVENTION

1. Field of the Invention

The present invention relates to speech processing and in particular to processing for speaker recognition.

2. Related Art

Recognition processing includes speaker recognition, in which the identity of the speaker is detected or verified, and speech recognition, in which a particular word (or, sometimes, a phrase or a phoneme, or other spoken matter) is detected. Speech recognition includes so-called speaker-independent recognition, in which speech data derived from multiple speakers is used in recognition processing, and so-called speaker dependent recognition, in which speech data derived from a single speaker is used in recognition processing. In general, in speech recognition, the processing aims to reduce the effects on the spoken word of different speakers, whereas in speaker recognition the reverse is true.

It is common in recognition processing to input speech data, typically in digital form, to a so-called front-end processor, which derives from the stream of input speech data a more compact, more perceptually significant set of data referred to as a front-end feature set or vector. For example, speech is typically input via a microphone, sampled, digitized, segmented into frames of length 10–20 ms (e.g. sampled at 8 KHz) and, for each frame, a set of K coefficients (typically 5–25) is calculated. Since there are N frames e.g. 25–100 per word, there are N×K (on the order of 1,000) coefficients in a feature vector. In speaker recognition the speaker to be recognized is generally assumed to be speaking a predetermined word, known to the recognition apparatus and to the speaker (e.g. a PIN in banking). A stored representation of the word, known as a template, comprises a reference feature matrix of that word previously derived from a speaker known to be genuine. The input feature matrix derived from the speaker to be recognized is compared with the template and a measure of similarity between the two is compared with a threshold for an acceptance decision.

A problem arises from the tendency of speakers to vary the rate at which words are spoken, so that an input speech matrix corresponding to a given word may be longer (i.e. consists of more frames) or shorter than the template for that word. It is therefore necessary for the recognition apparatus to time-align the two matrices before a comparison can be made, and one well known method of time-alignment and comparison is the Dynamic Time Warp (DTW) method described, for example, in "Speaker Independent Recognition of words using Clustering Techniques", Rabiner et al, IEEE Trans. on ASSP, vol 24, no. 4, August, 1979.

Various features have been used or proposed for recognition processing. In general, since the features used for speech recognition are intended to distinguish one word from another without sensitivity to the speaker whereas those for speaker recognition are intended to distinguish speakers for a known word or words, a feature suitable for one type of recognition may be unsuitable for the other. Some features for speaker recognition are described in "Automatic Recognition of Speakers from their voices", Atal, Proc IEEE vol 64 pp 460–475, April, 1976.

One known type of feature coefficient is the cepstrum. Cepstra are formed by performing a spectral decomposition (e.g. a spectral transform such as the Fourier Transform), taking the logarithm of the transform coefficients, and performing an inverse spectral decomposition.

In speaker recognition, the LPC (Linear Prediction Coefficient) cepstrum and FET (Fast Fourier Transform) cepstrum features are known, the former being more widely used.

In speech recognition, a known feature is the mel-frequency cepstrum coefficient (MFCC). A description of an algorithm for calculating MFCC's, and calculating a distance measure between an MFCC feature vector and a word template using Dynamic Time Warping is given in "On the evaluation of Speech Recognisers and Data Bases using a Reference System", Chollet & Gagnoulet, 1982 IEEE, International Conference on Acoustics, Speech and Signal Processing, pp 2026–2029, incorporated herein in its entirely (including its references).

An MFCC feature vector in general is derived by performing a spectral transform (e.g. a FFT), on each frame of a speech signal, to derive a signal spectrum; integrating the terms of the spectrum into a series of broad bands, which are distributed in an uneven, so-called 'mel-frequency' scale along the frequency axis; taking the logarithms of the magnitude in each band; and then performing a further transform (e.g. a Discrete Cosine Transform (DCT)) to generate the MFCC coefficient set for the frame. It is found that the useful information is generally confined to the lower order coefficients. The mel-frequency scale may, for example, be frequency bands evenly spaced on a linear frequency scale between 0–1 Khz, and evenly spaced on a logarithmic frequency scale above 1 KHz.

MFCC's eliminate pitch information, which is useful for speech recognition since this varies between speakers, but undesirable for speaker recognition. MFCC's have accordingly not been preferred for speaker recognition.

SUMMARY OF THE INVENTION

It is an object of the invention to provide a method and apparatus for speaker recognition, using an improved front end feature.

Accordingly, the invention provides a method and apparatus for speaker recognition in which a speech signal is processed to derive recognition features comprising a plurality of spectral amplitude coefficients, distributed on an uneven frequency scale, at least one of which is normalized by its average level over a time interval.

The normalization acts to reduce the effect of any long term filtering of the speech signal by, for example, a telecommunications channel through which it passes.

For example, the coefficients may be distributed on the mel-frequency scale. In this case they may be Mel-frequency Cepstral Coefficients. The normalization is conveniently performed by forming the long term arithmetic mean value of each coefficient, and subtracting this from each coefficient value; since the coefficients are logarithmic, the subtraction corresponds to division by the geometric mean of the source signal in each mel-frequency band.

It is found that mel-frequency cepstral coefficients, when normalized in this manner, provide a reliable feature set for recognising speakers, using only a relatively small number of coefficients, and moreover, that their use is particularly suited to telecommunications applications because the dependence upon the characteristics of the transmission channel between the speaker and the recognition apparatus is significantly reduced.

Other aspects and preferred embodiments of the invention are as disclosed and claimed herein, with advantages that will be apparent hereafter.

BRIEF DESCRIPTION OF THE DRAWINGS

The invention will now be described by way of example only, with reference to the following description and drawings, in which:

FIG. 8a is a flow diagram illustrating the operation of a comparison processor forming part of FIG. 2 in a speaker verification embodiment;

FIG. 8b is a flow diagram illustrating the operation of a comparison processor forming part of FIG. 2 in a speaker identification embodiment;

DETAILED DESCRIPTION OF EXEMPLARY EMBODIMENTS

Figure 1:
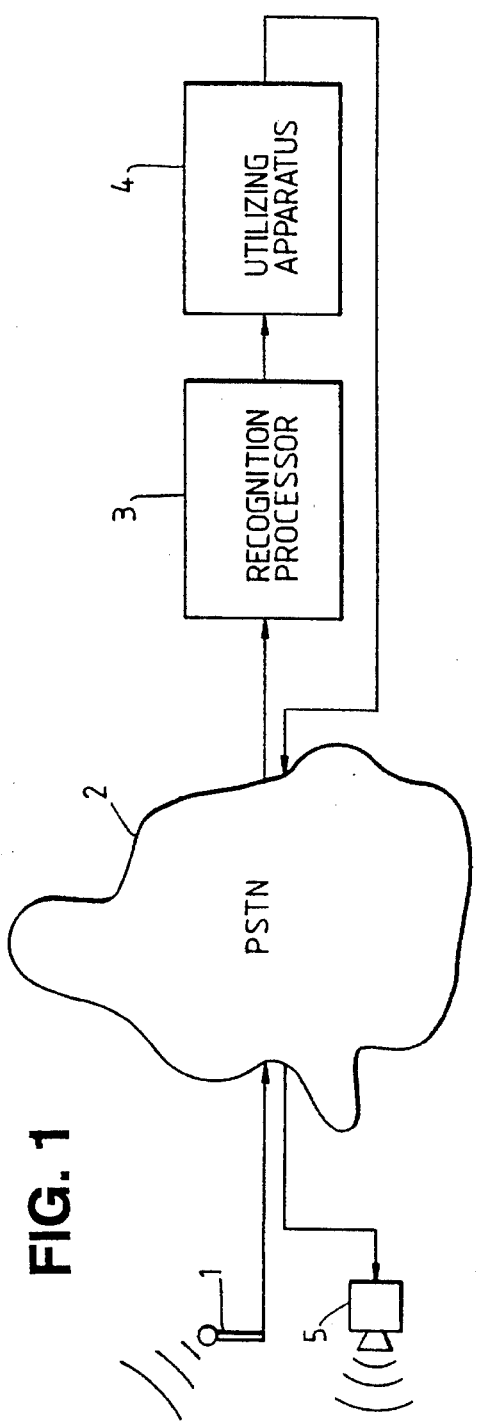
FIG. 1 shows schematically the employment of a recognition processor according to the invention in a telecommunications environment.

Referring to FIG. 1, a telecommunications system including speaker recognition generally comprises a microphone, 1, typically forming part of a telephone handset, a telecommunications network (typically a public switched telecommunications network (PSTN)) 2, a recognition processor 3, connected to receive a voice signal from the network 2, and a utilizing apparatus 4 connected to the recognition processor 3 and arranged to receive therefrom a voice recognition signal, indicating recognition or otherwise of a particular speaker, and to take action in response thereto. For example, the utilizing apparatus 4 may be a remotely operated banking terminal for effecting banking transactions.

In many cases, the utilizing apparatus 4 will generate an auditory response to the speaker, transmitted via the network 2 to a loudspeaker 5 typically forming a part of the subscriber handset.

In operation, a speaker speaks into the microphone 1 and an analog speech signal is transmitted from the microphone 1 into the network 2 to the recognition processor 3, wherein the speech signal is analyzed and a signal indicating identification or otherwise of a particular speaker is generated and transmitted to the utilizing apparatus 4, which then takes appropriate action in the event of recognition of the speaker.

Typically, the recognition processor needs to acquire data concerning the identify of the speaker against which to verify the speech signal, and this data acquisition may be performed by the recognition processor in a second mode of operation in which the recognition processor 3 is not connected to the utilizing apparatus 4, but receives a speech signal from the microphone 1 to form the recognition data for that speaker. However, other methods of acquiring the speaker recognition data are also possible; for example, speaker recognition data may be held on a card carried by the speaker and insertable into a card reader, from which the data is read and transmitted through the PSTN to the recognition processor prior to transmission of the speech signal.

Typically, the recognition processor 3 is ignorant of the route taken by the signal from the microphone 1 to and through the network 2; the microphone 1 may, for instance be connected through a mobile analog or digital radio link to a network 2, or may originate from another country, or from one of a wide variety of types and qualities of receiver handset. Likewise, within the network 2, any one of a large variety of transmission paths may be taken, including radio links, analog and digital paths and so on. Accordingly, the speech signal Y reaching the recognition processor 3 corresponds to the speech signal S received at the microphone 1, convolved with the transfer characteristics of the microphone 1, link to network 2, channel through the network 2, and link to the recognition processor 3, which may be lumped and designated by a single transfer characteristic H.

Recognition Processor 3

Figure 2:
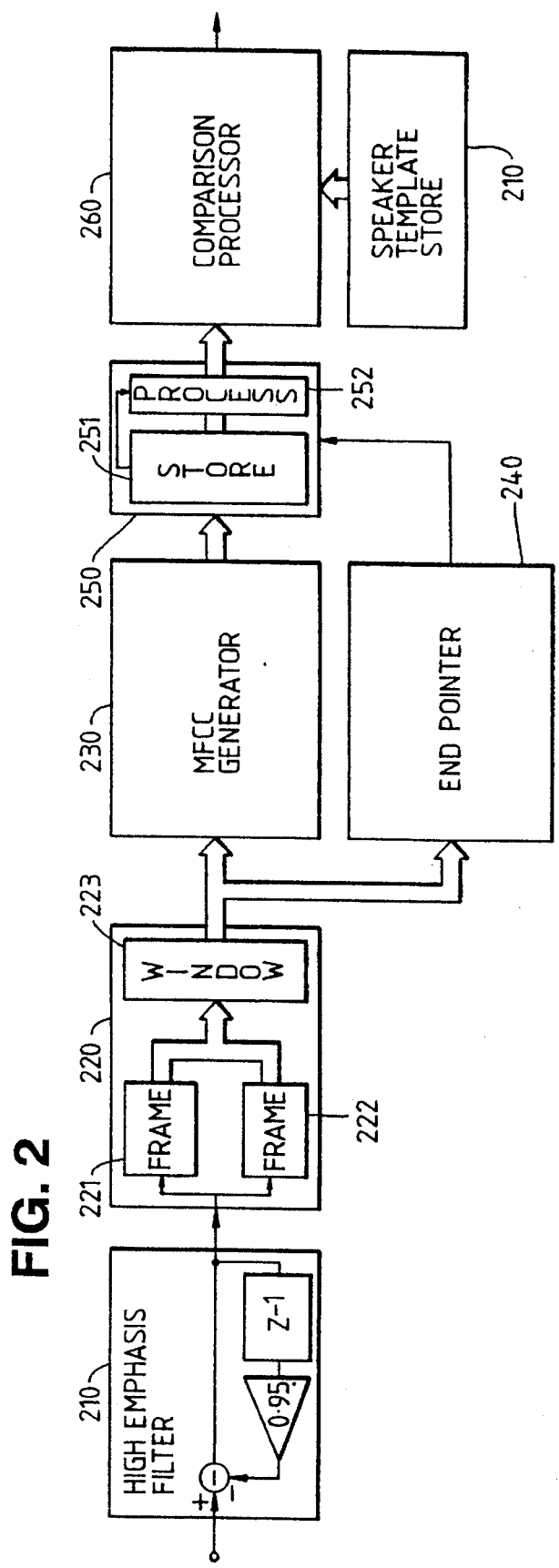
FIG. 2 is a block diagram showing schematically the functional elements of a recognition processor according to an embodiment of the invention.

In FIG. 2, the functional elements of a recognizer according to the preferred embodiment are shown. A high emphasis filter 210 receives the digitized speech waveform at, for example, a sampling rate of 8 KHz as a sequence of 8-bit numbers and performs a high emphasis filtering process (for example by executing a $1-0.95.z^{-1}$ filter), to increase the amplitude of higher frequencies. A speech frame generator 220 receives the filtered signal and forms a sequence of frames of successive samples. For example, the frames may each comprise 256 contiguous samples, and each frame may be overlapped with the succeeding and preceding frames by 50%, so as to give frames of length 32 ms, at a rate of 1 per 16 ms. For example, a pair of frame buffers 221, 222, with a 16 ms differential delay, may be filled in parallel and read out in alternation.

To eliminate spurious frequency artifacts due to the discontinuities at the start and end of each frame, preferably each frame is then passed through a Hamming window processor 223, which (as is well known) scales down the samples towards the edge of each window.

Each frame of 256 windowed samples is then processed by an MFCC generator 230 to extract a set of MFCC coefficients (for example 8 coefficients). At the same time, each windowed frame is supplied to an end point detector 240 which detects the start and finish of a speech utterance and supplies a speech/non-speech control signal to a normalizer 250 comprising a coefficient store memory 251 and a normalizing processor 252. The normalizer 250, after receiving a 'speech start' signal from the end pointer 240, stores some or all of the 8 coefficients for each successive frame in the normalizer coefficient store 251 until the 'end of speech' signal is received from the end pointer 240. At this point, the normalizing processor 252 calculates from the stored coefficients for each speech frame in store 251 an arithmetic mean coefficient value for each of the 8 coefficients. The arithmetic mean coefficient value for each coefficient is then subtracted from the respective stored coefficient value for each frame, to provide a normalized matrix comprising 8×N coefficients (where N is the number of frames between the start point and the end point of a spoken utterance).

This normalized coefficient matrix is supplied to a comparison processor 260, which reads a corresponding matrix associated with a given speaker from a speaker template store 270, performs a comparison between the two, and generates a recognition/non-recognition output signal in dependence upon the similarity between the normalized speech vector and the speaker template from the speaker template store 270.

The high emphasis filter 210, window processor 223, MFCC generator 230, end pointer 240, normalized processor 252 and comparison processor 260 may be provided by one or more digital signal processor (DSP) devices and/or microprocessors, suitably programmed, with the frame buffers 221, 222, coefficient store 251 and speaker template store 270 provided within read/write memory devices connected thereto.

MFCC Generation

Figure 3:
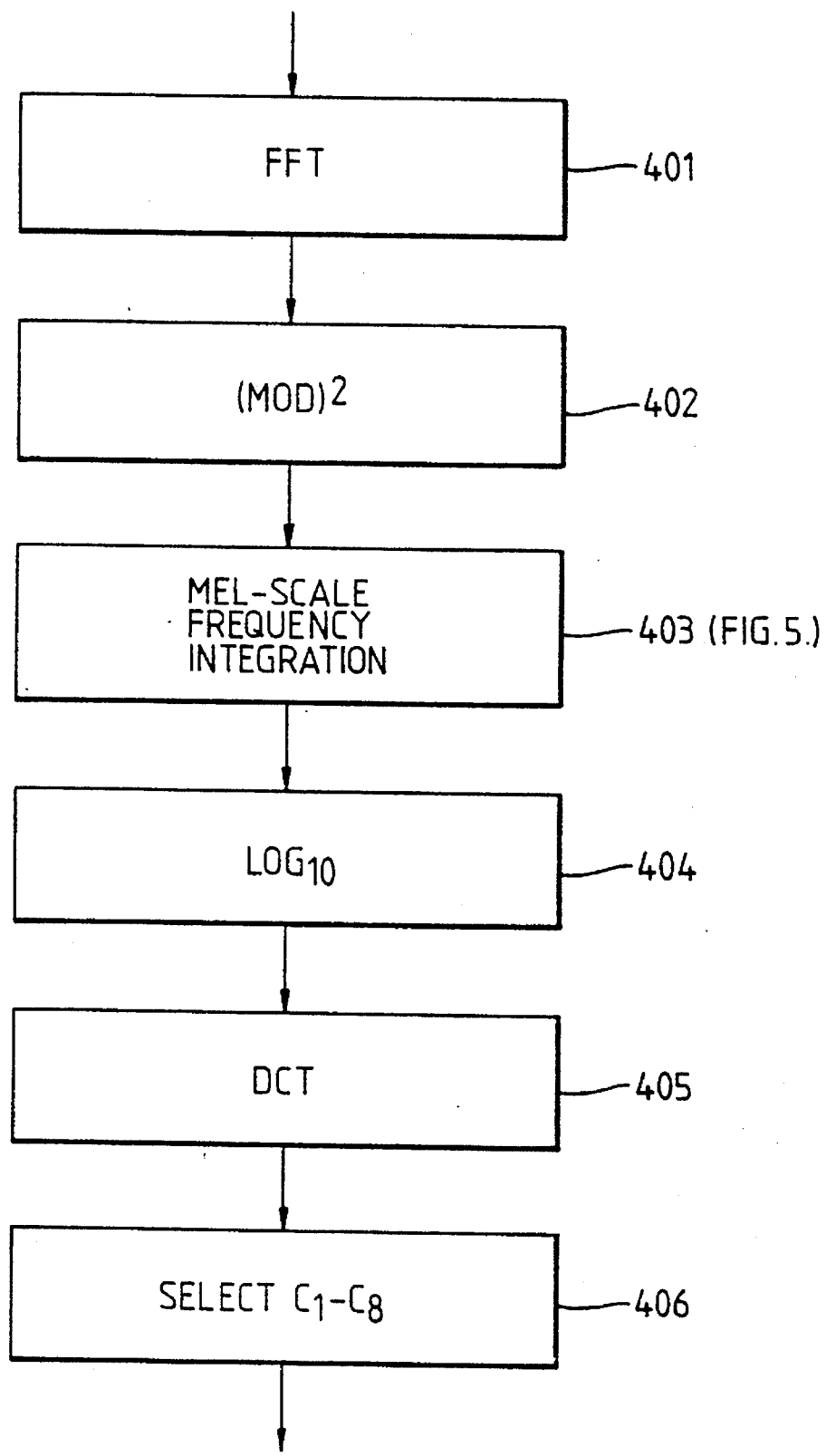
FIG. 3 is a flow diagram showing schematically the operation of an MFCC generator forming part of FIG. 2.
Figure 4A:
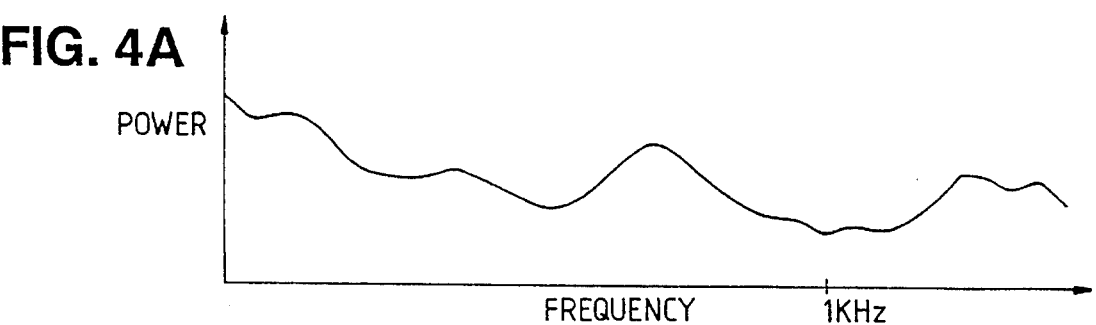
FIG. 4 is an illustrative diagram in the frequency domain illustrating part of the process of FIG. 3.
Figure 4B:
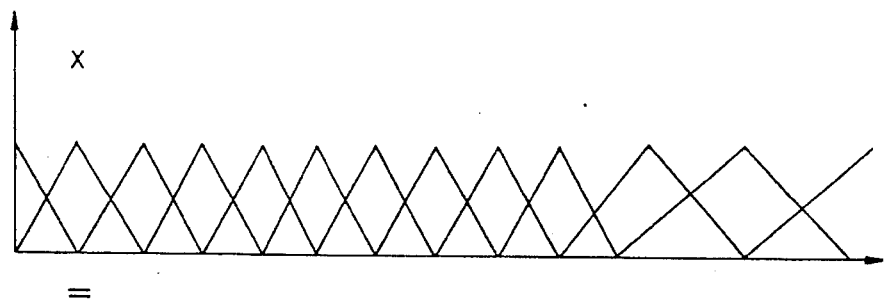
Figure 4C:
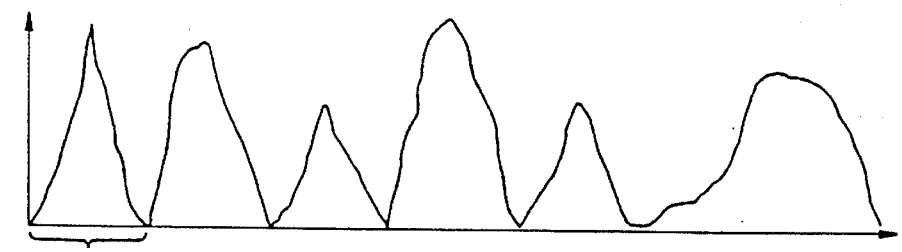
Figure 4D:
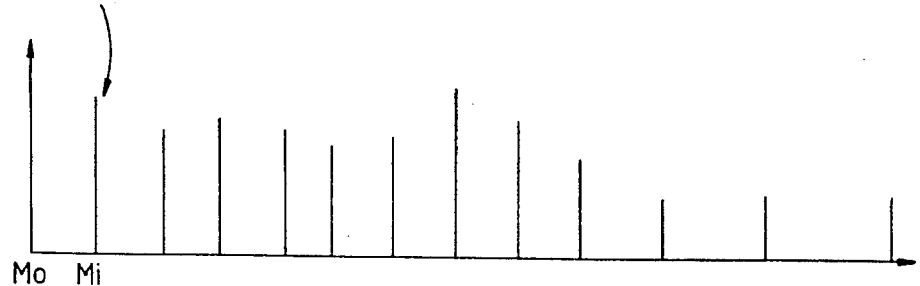

Referring to FIG. 3, the process performed by the MFCC generator 230 comprises performing a Fourier transform on each frame, to provide 256 transform coefficients, in a step 401; forming the power spectrum of the speech signal from the Fourier coefficients by summing the squares of the Real and Imaginary components at each frequency, to provide a 128 coefficient power spectrum in step 402; integrating the power spectrum over 19 frequency bands in a step 403 as discussed in greater detail below with reference to FIG. 4, to provide 19 band power coefficients; taking the log (for example to base 10) of each of the 19 coefficients in a step 404; performing a discrete cosine transform on the 19 log values in a step 405, and selecting the lowest order 8 coefficients in a step 406.

The discrete cosine transform is well known and described in, for example, the above referenced Chollet and Gagnoulet paper; briefly, the Nth cosine component of $M_m$ is given by $$Y_m = \frac{\sum_{n=1}^{N} A(n) \cdot \cos(m\Pi(n+0.5))}{N}$$

where N is the number of discrete frequency bands (in this case 20, with a frequency domain rotation applied to obtain the 20th point) and A(n) is the amplitude in the mth frequency band. The effect of the DCT is to decorrelate the coefficients A(n) to a large extent.

Referring to FIG. 4, graph 4a notionally indicates a portion of the power spectrum produced in step 402. Graph 4b shows a corresponding portion of the mel-frequency triangular integration windows along the frequency axis. The triangular windows comprise ten windows linearly spaced along the frequency axis, each overlapping its neighbours by 50%, between 0–1 KHz and a further ten windows, triangular and overlapping by 50% on a logarithmic frequency scale above 1 KHz.

Graph 4c shows schematically the effect of multiplying, pointwise, each sample in the power spectrum by the corresponding term in one of the triangular windows; for clarity, only even number windows have been shown.

Next, the windowed values of Graph 4c are integrated across each window, to provide a single summed coefficient corresponding to that window, as shown in Graph 4d.

The 19 coefficients thus produced (the zero frequency coefficient $M_0$ being ignored) thus correspond to the power which would be generated in the output of each of a corresponding set of band pass filters, filters below 1 KHz having equal evenly spread band widths and those above 1 KHz having band widths which are equal and evenly spread on a logarithmic frequency scale.

Endpointing

Figure 5:
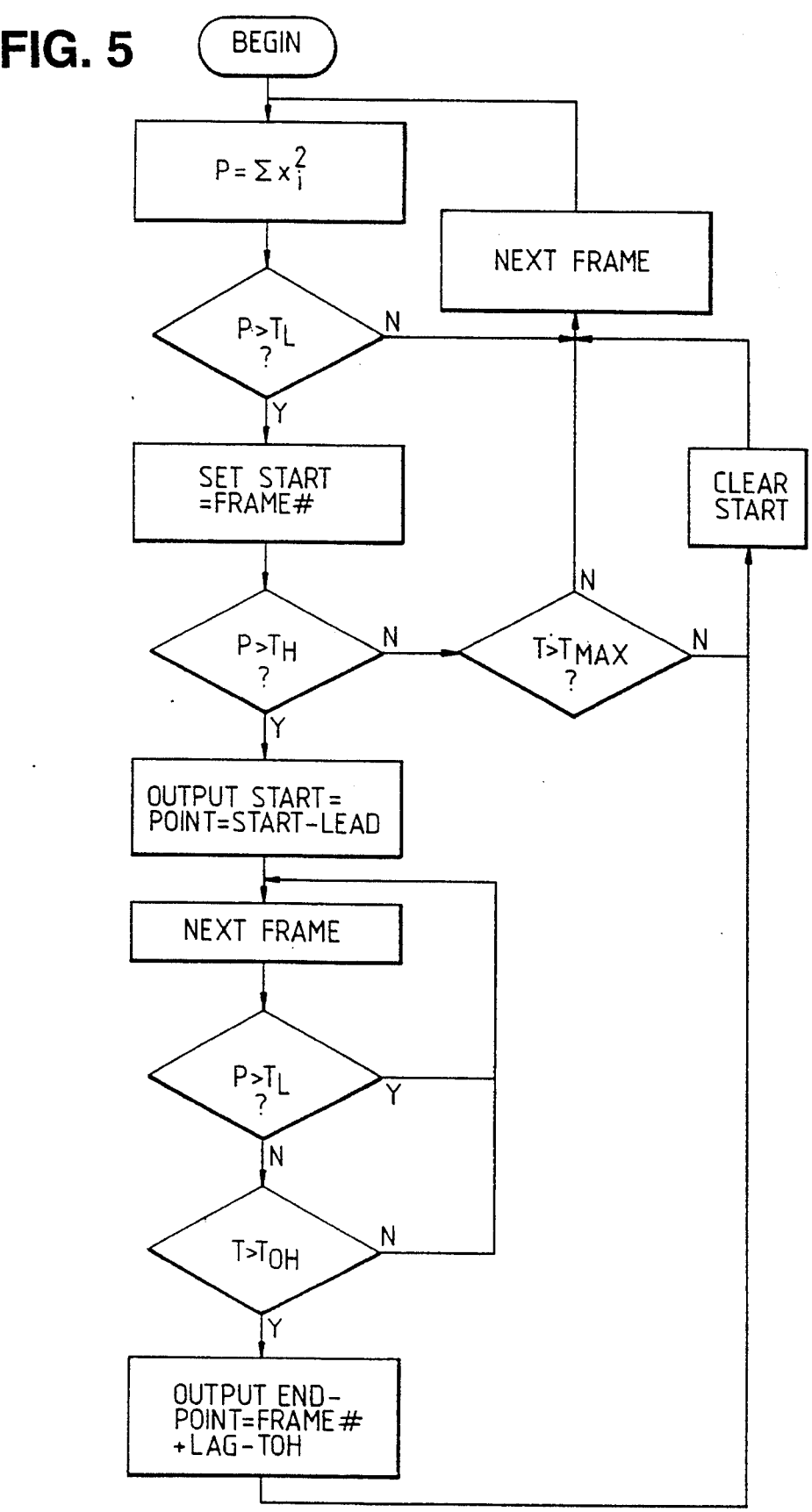
FIG. 5 is a flow diagram showing in greater detail the operation of an end point detector forming part of FIG. 2.
Figure 6:
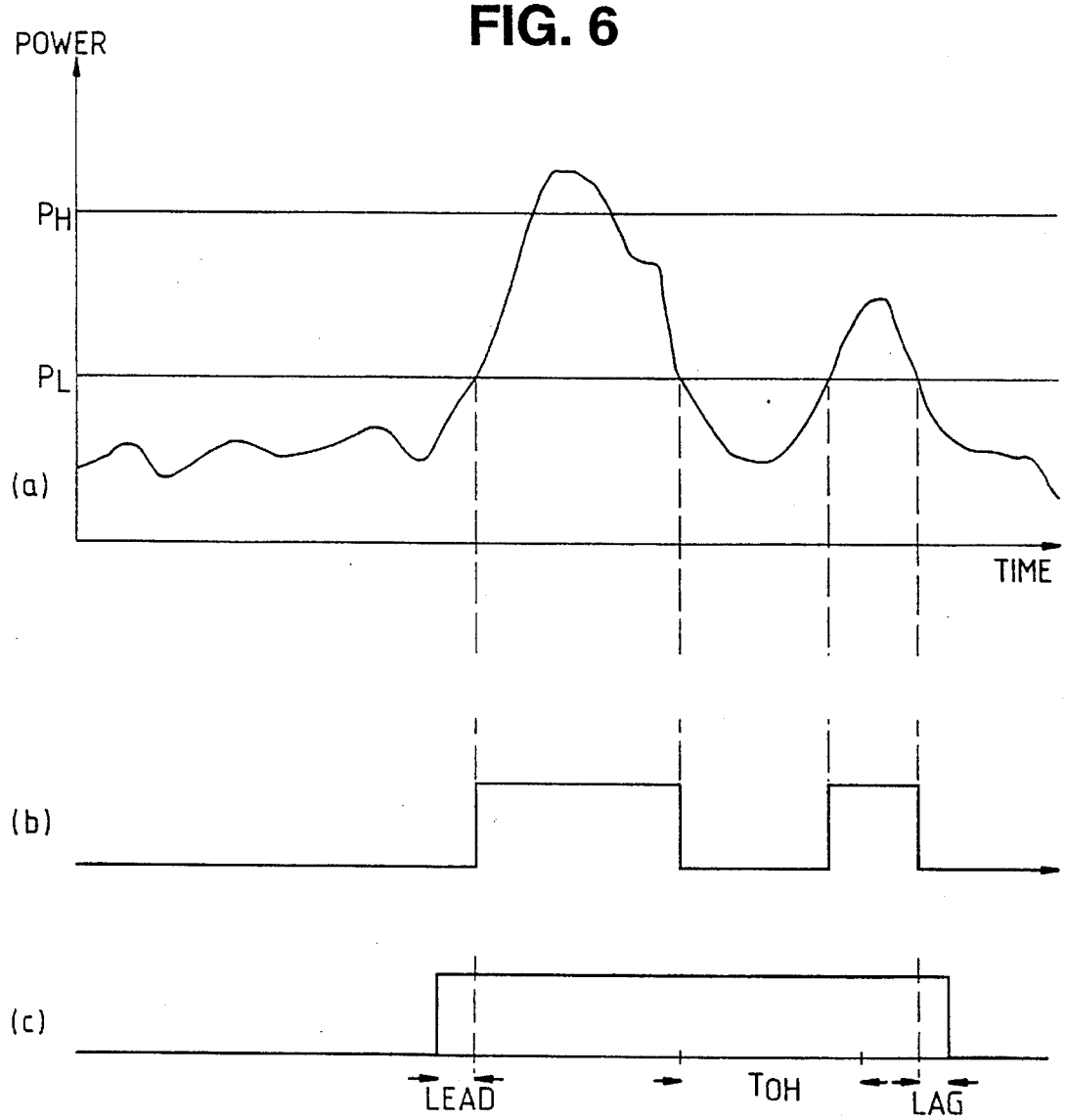
FIG. 6 is an illustrative diagram of amplitude against time to illustrate the process of FIG. 5.

Referring to FIGS. 5 and 6, the operation of the end pointer 240 of FIG. 2 will now be discussed in greater detail.

The endpointer 240 initially squares and sums the signal values within each frame to provide a measure P of the power or energy in the frame.

The value of P is tested against the first threshold $P_L$, which is set at a relatively low level such that it may occasionally be crossed by noise signals. No action is taken until a frame has a power level above this low threshold $P_L$. On a frame rising above the low threshold $P_L$, a flag indicating a number assigned to that frame is stored (shown as a variable "START" in FIG. 5).

When the value of the power P in a frame rises above an upper threshold $P_H$, which corresponds to the presence of speech and which is at a level above likely noise levels, speech is assumed to be present. The point taken as the start point of the speech is a frame of predetermined number ("LEAD") of frames before that ("START") at which the signal rose above the low threshold $P_L$. In this way, although speech is only confirmed to be present when the signal level rises above the high threshold, the start of the utterance is not lost. Accordingly, the number of the frame thus calculated as the start point is output by the endpointer 240 to control the normalizer 250.

If the level of the speech signal remains between the two thresholds for longer than a predetermined time $T_{max}$, the value "START" is cleared.

On the frame energy dropping from the upper threshold $P_H$ below the lower threshold $P_L$, the end pointer 240 waits through a predetermined number of frames termed the "overhang" time $T_{oh}$. If the level rises above the lower threshold $P_L$ again, within the overhang time, speech is assumed still to be present. Once the power level of the signal has fallen below the lower threshold $P_L$ for more than $T_{oh}$ frames, the utterance is assumed to be over, and the endpointer outputs an end point frame number which corresponds to current frame number, less the number of frames $T_{oh}$ (i.e. the point at which the signal was last at the threshold $P_L$), plus a predetermined number of frames termed the "LAG".

Normalization

Figure 7:
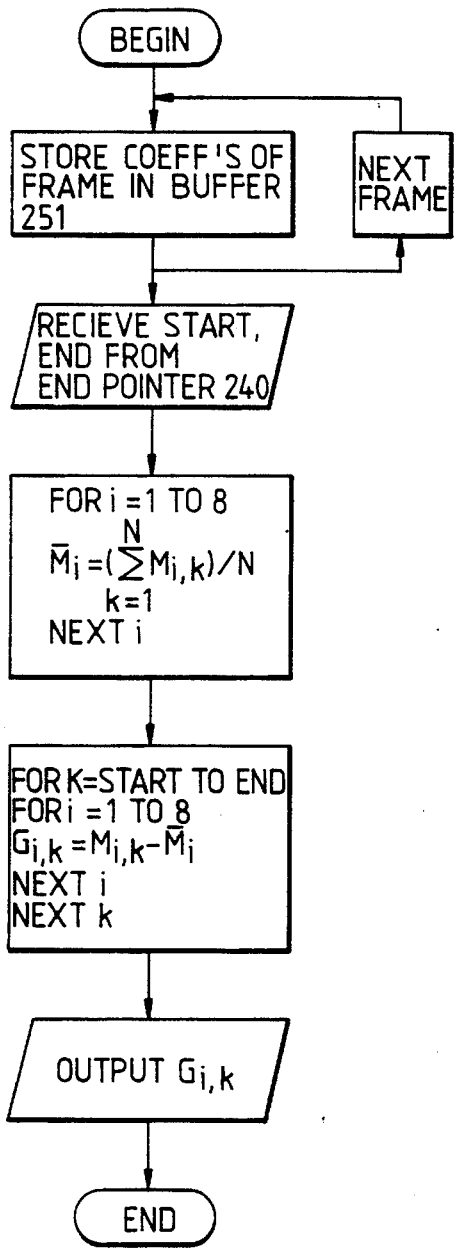
FIG. 7 is a flow diagram indicating schematically the operation of a normalization processor forming part of FIG. 2 in a preferred embodiment.

Referring to FIG. 7, the normalization process carried out by the normalizer 250 will now be described in greater detail.

The frames of 8 MFCC coefficients per frame are stored in the coefficient buffer 251 successively. After the endpointer 240 detects the end of the spoken utterance, it signals the start and end frame numbers to the normalizer 250. The normalizing processor 252 then, for each of the 8 coefficients, recalls the value of that coefficient from the memory for all frames between the start and the end frame and forms the arithmetic mean by adding the coefficient values and dividing by N, the number of frames between the start and the end frames. This provides a set of 8 average values $\overline{M}_i$ (i=1 to 8).

Next, for each coefficient of each frame, the normalizing processor 252 calculates a normalized coefficient value $G_{i,k}$, (where K is the frame number) by subtracting the corresponding average value $\overline{M}_i$ from each coefficient value $M_{i,k}$.

The set of 8×N coefficients making up the normalized vector $G_{i,k}$ are then output by the normalization processor 252.

Comparison Processing

A detailed description of the comparison processor 260 is unnecessary since its operation is conventional. FIG. 8a indicates schematically the operation of the comparison processor in speaker verification; in essence the comparison processor reads the feature vector G comprising the normalized MFCCs; reads a speaker template T comprising a corresponding reference vector of coefficients; performs a comparison between the two vectors using for example the well known Dynamic Time Warp algorithm to time-align the two (using, for example, the algorithm given in the above Chollet and Gagnoulet paper) to generate a scalar distance measure D indicating the difference between the two vectors and tests the distance measure D against the threshold. If the distance D is lower than the threshold, the speaker is accepted as corresponding to the stored template; otherwise the speaker is rejected. FIG. 8b shows the corresponding operation of the comparison processor 260 in speaker identification; in this case, a plurality of different vectors $T_i$ are read in succession from the template store 270, and the speech vector G is compared with each in turn to generate a corresponding distance metric $D_i$. The speaker is then identified as corresponding to the template from which the speech vector differs the least (i.e. which gave rise to the smallest metric $D_i$).

ALTERNATIVE EMBODIMENTS

In the foregoing embodiment, as discussed in relation to FIG. 7, the normalizer 250 needs to know both the start point and the end point of the utterance before it can calculate N (the number of frames between the start point and the end point), and the sum of the coefficient values $M_{TOT}$, and hence the average value of each coefficient, and hence the normalized value of each coefficient. Accordingly, the normalization 250 must await detection of the end point by the endpointer 240, and subsequent recognition processing is delayed until the end of the utterance. In many applications, and with fast hardware, this delay may not give rise to difficulties. However, in other applications it may be preferable to begin normalization before the end of the utterance.

Accordingly, in a first alternative embodiment, instead of normalizing the coefficients by subtracting the arithmetic mean value of each coefficient over the whole utterance, coefficients are normalized by subtracting a running average which is updated periodically (for example, on a frame by frame basis).

Figure 9:
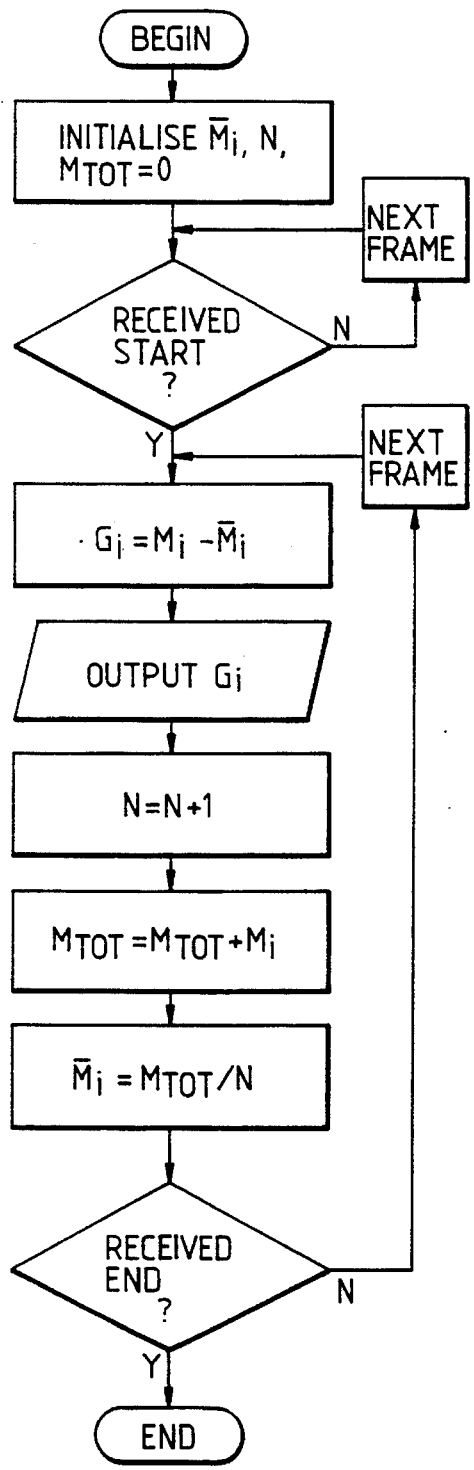
FIG. 9 is a flow diagram showing the operation of a normalization processor forming part of FIG. 2 in an alternative embodiment to that of FIG. 7.

Referring to FIG. 9, accordingly, in this embodiment after the endpointer 240 signals the beginning of the utterance, the normalization processor 252 reads, for each coefficient, the present average value for that coefficient $\overline{M}_i$; subtracts this from the value $M_i$ of the MFCC coefficient to form a normalized coefficient $G_i$; increments a frame counter N; adds the coefficient value $\overline{M}_i$ to the current total value $M_{TOT}$, and divides the sum by the frame counter N, the result being stored as the new value of the coefficient average value $\overline{M}_i$. The normalized coefficient values $G_i$ for each frame can therefore be released immediately.

It is anticipated that a running average of this type is likely to perform slightly less well than the preferred embodiment, since initially the "average" value is not formed from a representative number of samples. However, some improvement in the performance is nonetheless anticipated when compared to unnormalized coefficients. Naturally, other methods of calculating a running average (for example, using a moving window of past samples or updating less frequently than every frame) are equally possible. In embodiments of this type, the coefficient store 251 may be dispensed with.

In the foregoing embodiments, description has been made of endpointing and normalizing over a single contiguous utterance (i.e. a single word). If speaker identification based on several separate words is to be performed, then the process described in the above embodiments could be repeated for each successive word in isolation. However, some information useful in discriminating speakers may be found in the relative level of the coefficient values of each word relative to the others.

Accordingly, in a further embodiment the long term average value $\overline{M}_i$ formed by the normalizer 250 is formed over all the words of the utterance. In a first example according to this embodiment, this is achieved by forming the average over all the frames between the start and end points of each word, as if the words followed immediately one after another as a single utterance, and ignoring the non-speech frames in between the words.

The same result is achieved in a second example, by deriving separate averages as in the foregoing embodiments, for each word, and then adding the averages each weighted by the respective number of frames in the word from which it is derived, so as to form a weighted average from all the words, and then dividing each coefficient of every word by the weighted average derived across all words.

In the foregoing two examples, the weight given to the average corresponding to each individual word varies depending upon the length of the word, which is turn varies with the rate at which the speaker speaks the word (which is variable independently of the spectral characteristics of the way in which the speaker speaks the word).

Accordingly, in an alternative embodiment, a long term average is formed by forming the average over each word in isolation as before, and then forming a weighted average from the individual averages, but employing predetermined weights corresponding, for example, to the length of the corresponding stored template in the template store which represents that word, rather than the actual duration of the word as in the previous examples. In this way, the dependence on the rate at which the words are spoken is reduced.

Although it might under some circumstances be possible to dispense with the end pointer 240 and form a long term average over the entire duration of the telephone call, in practice this is generally not preferred because during periods of non-speech, the received signal level is generally too low to provide a reliable indication of the spectrum of the communication channel and, furthermore, it is difficult to separate the spectrum of the channel from that of any noise present.

In the above described embodiments, recognition processing apparatus suitable to be coupled to a telecommunications exchange has been described. However, in another embodiment, the invention may be embodied on simple apparatus connected to a conventional subscriber station connected to the telephone network; in this case, analog to digital conversion means are provided for digitizing the incoming analog telephone signal.

Although reference is made to the use of programmable digital signal processing (DSP) devices, it will equally be recognized that a conventional general purpose microprocessor operating at sufficient speed might instead be employed. Likewise, a custom designed large scale integration (LSI) logic circuit could be employed.

The invention has been described with reference to MFCC's, but filter banks on uneven frequency scales approximating to, or differing from, the mel-frequency scale could be used. While triangular windows have been described above for the integration in the frequency domain, it will be appreciated that other window shapes could equally be employed. While a digital processor for calculating MFCC values has been described, it would in principle be possible to provide instead a plurality of band pass analog or digital filters, corresponding to the bands shown in Graph 4b, and to sample the power in each filter band.

Whilst the invention has been shown to be surprisingly advantageous in application to MFCC's its application to other front end features (preferably Cepstral features) is not excluded.

While a comparison process using the Dynamic Time Warp (DTW) process has been discussed, the invention is equally applicable to recognition employing other types of comparison processing. For example, comparison processing employing hidden Markov modelling (HMM), as disclosed in British Telecom Technology Journal, Vol. 6, No. 2 April 1988, S. J. Cox "Hidden Markov Models for Automatic Speech Recognition: Theory And Application", pages 105–115, or Neural Networks (for example of the well known multilayer perceptron (MLP), or the "self-organizing" types, both of which are discussed in the same issue of the British Telecom Technology Journal) may be used.

While the application of the invention to speaker recognition has herein been described, it will be apparent that aspects of the invention may also be applicable to other recognition tasks (e.g. speech recognition).

TEMPLATE GENERATION

In general, the present invention employs a stored reference model ("template" for DTW recognition) for the or each speaker to be identified. Methods of deriving reference models are well known, and for understanding the present invention it is therefore sufficient to indicate that each template may be formed by a process of inputting a plurality of utterances of the same word by a speaker; digitizing the utterances; deriving the normalized set of coefficients $G_i$ in the same way as discussed above for each of the utterances; aligning the utterances in time using, for example, a Dynamic Time Warp process; and then averaging the time aligned coefficient vectors of the utterances to derive an averaged coefficient vector which provides the reference model T. In other words, the process of forming a reference model for use with a given feature set in subsequent recognition is generally the same as the process of deriving the feature set itself, a number of feature sets being averaged to give the reference model.

EFFECTS OF THE INVENTION

Figure 10:
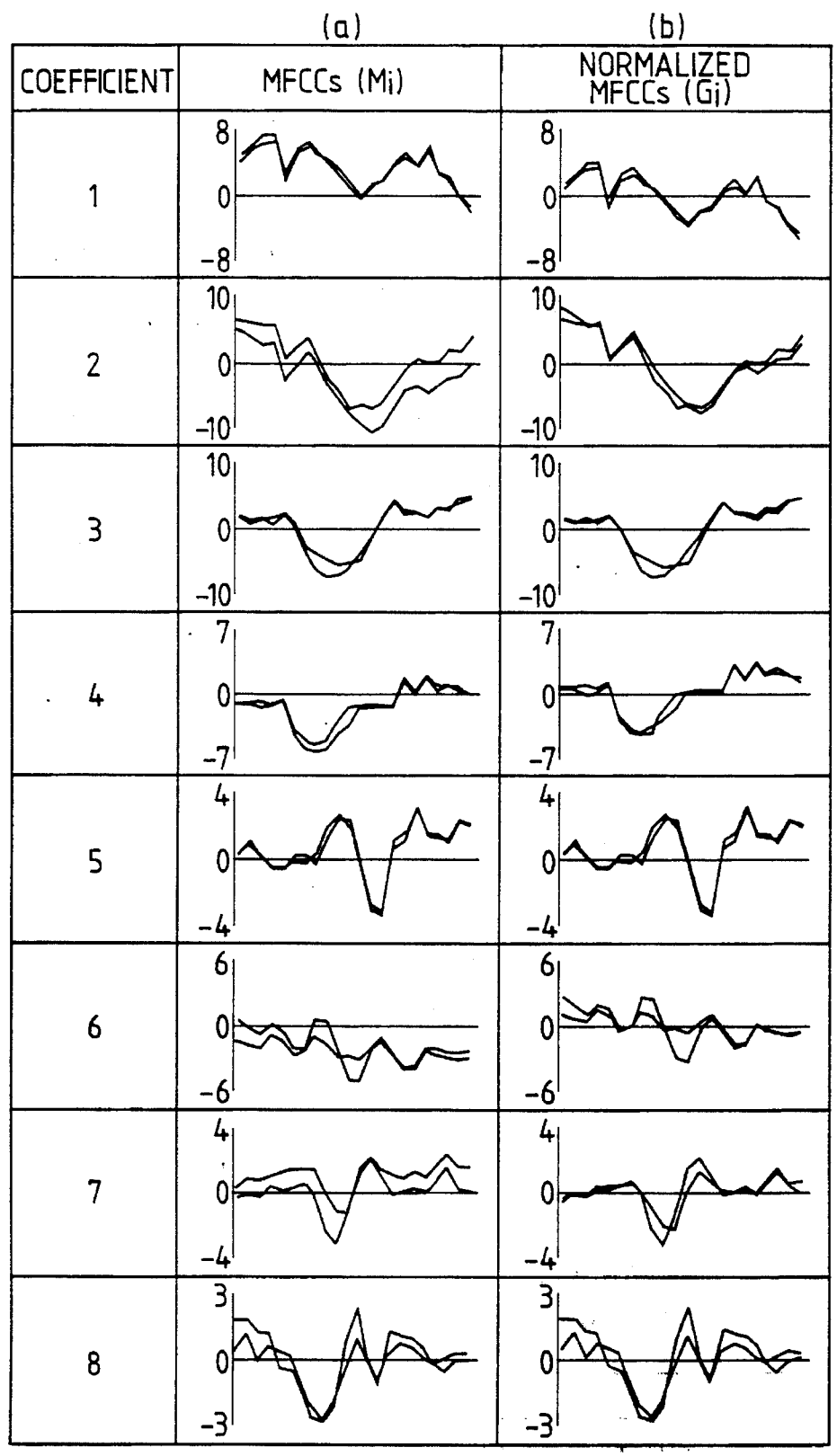
FIG. 10a is an illustrative plot of MFCC coefficient values against time for each of two different telecommunications channel.
FIG. 10b is a corresponding plot of coefficients normalised according to the preferred embodiment of FIG. 7.

Referring to FIG. 10, column (a) (the left-hand column) shows for each of the 8 MFCCs a graph of coefficient value over time during an utterance. In each case, two traces are shown; these correspond to the same recorded utterance transmitted via two different transmission channels. It will be noted that, particularly in the second and seventh coefficient, the channel results in a substantially constant offset between the two traces, corresponding to the difference in transfer characteristic in the corresponding frequency bands between the two channels.

In the Dynamic Time Warp process, as in other processes in which portions of two patterns to be compared are brought into time alignment, the Dynamic Time Warp process essentially shifts portions of a waveform along the time axis to find a match with another waveform. Where, as here, two waveforms are vertically displaced, then this process of shifting along the time axis (i.e. horizontal shifting) will result in a mismatch and hence in increased likelihood of misrecognition or reduced likelihood of correct recognition.

Referring to column (b), in the right-hand column, the corresponding plots of normalized MFCC's according to the invention are shown. By referring to the 2nd, 6th and 7th coefficients in particular, it will be seen that removal of the average value has in each case brought the two traces into closer alignment. Thus, when a speech vector is compared with a template which may have been derived is compared with a template which may have been derived through a different communications channel, the Dynamic Time Warp comparison processing is less likely to misidentify the speaker due to the effect of the transmission channel.

As noted above, the (generally linear) path from the speaker to the recognition processor can be represented by a lumped transfer characteristic H, comprising the product of cascaded transfer functions of successive stages of the path. Thus, in the frequency domain, each spectral component of the speech signal received by the recognition processor comprises the product of the spectral component of the voice of the speaker with the corresponding spectral component of the transfer function of the communication channel or path. Thus, if the transfer characteristic H of the channel were known the effect of the channel on the speech signal could be removed by dividing each term of the received signal spectrum by the corresponding term of the transfer characteristic H.

However, in a telecommunications system, because of the plurality of diverse alternative signal paths it is not possible directly to model the channel transfer function H. However, it is observed that the channel transfer function is generally spectrally stationary (i.e. does not change much over time). Accordingly, if a time series of a single spectral component is examined, the transfer function acts as a constant multiplicative factor on each value in the series. The geometric mean of each component in the time series is therefore the product of this constant factor and the geometric mean of the original time series. Thus, the effect of the channel is eliminated if each term in the received speech signal spectrum is divided by its long term average.

In taking logarithms of each spectral term, rather than forming the long term geometric mean and dividing thereby it is possible to from the long term arithmetic mean of the logged spectral term and subtract this arithmetic mean from each spectral term.

In the windowing and integrating stages of generating MFCCs, it is through that there is some transformation of this relationship, so that the foregoing analysis does not entirely apply to the normalization of MFCCs but is merely illustrative of the effect of the invention.

The normalization process removes not only the effect of the channel, but also some speech and speaker information. It might therefore be thought that this would reduce the accuracy of recognition, by removing data which could be used to distinguish between two speakers. In fact, surprisingly, after extensive experiments we have found that this is not the case.

We claim:

1. A method of speaker recognition, said method comprising the steps of:

deriving recognition feature data from an input speech signal represented by plural successive frames of digital data for a speech utterance, said recognition feature data comprising a plurality of coefficients each related to speech signal magnitude in a predetermined frequency band;

comparing said feature data with predetermined speaker reference data;

indicating recognition of a speaker in dependence upon the comparison;

said frequency bands being unevenly spaced with respect to frequency, said deriving step including a step of deriving a long term average spectral magnitude extending over plural of said frames of digital data; and processing at least one of said coefficients so as to generate a normalized coefficient in which the effect of said long term magnitude is substantially reduced.

2. A method as in claim 1, in which the frequency bands are spaced on a mel-frequency scale.

3. A method as in claim 1, in which the frequency bands are spaced linearly with respect to frequency below a predetermined limit and logarithmically with respect to frequency above said limit.

4. A method as in claim 1 in which the deriving step includes a step of generating a logarithm of said magnitude, generating a logarithmic long term average value and subtracting the logarithmic long term average from the logarithmic magnitude.

5. A method as in claim 1 in which said comparing step time-aligns the feature data with the reference data.

6. A method as in claim 5, in which the comparing step employs a Dynamic Time Warp process.

7. A method as in claim 1 further comprises:

recognizing a speech start point and a speech end point within said input speech signal; and deriving said long term average over the duration between said start point and said end point.

8. A method as in claim 1 in which said long term average comprises the long term mean.

9. A method as in claim 1 in which said long term average comprises a moving average which is periodically updated.

10. A method as in claim 1 further comprising:

inputting a plurality of words one after another, and forming said long term average over all of said words.

11. Apparatus for speaker recognition which comprises:

means for generating a plurality of feature data comprising a series of coefficient sets from a speech signal represented by plural successive frames of digital data for a speech utterance, each set comprising a plurality of coefficients indicating short term spectral magnitude in a plurality of unevenly spaced frequency bands, means for comparing said feature data with predetermined speaker reference data and for indicating recognition of a corresponding speaker in dependence upon said comparison, and means for deriving a long term average spectral magnitude of at least one of said coefficients extending over plural of said frames of digital data and for normalizing the said at least one coefficient by said long term average.

12. Apparatus as in claim 11, in which the frequency bands are spaced on a mel-frequency scale.

13. Apparatus as in claim 11, in which the frequency bands are spaced linearly with respect to frequency below a predetermined limit and logarithmically with respect to frequency above said limit.

14. Apparatus as in claim 11 in which the means for generating said coefficients are arranged to generate a logarithm of said magnitude, to generate a logarithmic long term average value and to subtract the logarithmic long term average from the logarithmic coefficient magnitude.

15. Apparatus as in claim 11 in which said means for comparing is arranged to time-align the feature data with the reference data.

16. Apparatus as in claim 15, in which the means for comparing employs a Dynamic Time Warp process.

17. Apparatus as in claim 11 further comprising:

means for recognizing a start point and an end point within said speech signal, said means for deriving and normalizing is arranged to derive said long term average over the duration of a speech utterance between said start point and said end point.

18. Apparatus as in claim 11 in which said long term average comprises the long term means.

19. Apparatus as in claim 11 in which said long term average comprises a moving average which is periodically updated.

20. Apparatus as in claim 11 arranged for inputting speech signals representing a plurality of words one after another, in which said means for deriving and normalizing is arranged to form said long term average over all of the said words.

21. Apparatus as in claim 11 adapted to be connected to a telephone network.

22. A telephone network comprising apparatus as in claim 21.

23. Apparatus for recognition processing of a voice signal represented by plural successive frames of digital data for a speech utterance, said apparatus comprising:

means for deriving recognition data comprising a plurality of signals each related to short term amplitude in a corresponding frequency band of said voice signal said frequency bands being unevenly spaced in the frequency domain, means for performing recognition processing using said recognition data, means for periodically generating or updating a moving long term average spectral amplitude extending over plural of said frames of digital data in said frequency bands; and means for processing feature data based on said recognition data using said long term average to reduce their dependence upon stationary spectral envelope components.

24. A method of speaker recognition, said method comprising:

generating recognition feature data from an input speech signal, said recognition feature data comprising a plurality of coefficients each related to the speech signal magnitude in a predetermined frequency band, said frequency bands being unevenly spaced along the frequency axis, the step of generating said coefficients including a step of deriving a long term average spectral magnitude and processing at least one of said coefficients so as to generate a normalized coefficient in which the effect of said long term magnitude is substantially reduced;

comparing said feature data with predetermined speaker reference data; and indicating recognition of a speaker in dependence upon the comparison.

25. A method as in claim 24 in which the frequency bands are spaced on a mel-frequency scale.

26. A method as in claim 24 in which the frequency bands are spaced linearly for frequencies below a predetermined limit and logarithmically for frequencies above said limit.

27. A method as in claim 24 wherein the step of generating said coefficients includes the sub-steps of:

generating a logarithm of said magnitude, generating a logarithmic long term average value, and subtracting the logarithmic long term average from the logarithmic magnitude.

28. A method as in claim 24 wherein said comparison includes time-alignment of the feature data with the reference data.

29. A method as in claim 28 wherein the comparison employs a Dynamic Time Warp process.

30. A method as in claim 24 further comprises:

recognizing a speech start point and a speech end point within said input speech signal; and deriving said long term average over the duration between said start point and said end point.

31. A method as in claim 24 wherein said long term average comprises the long term mean.

32. A method as in claim 24 in which said long term average comprises a moving average which is periodically updated.

33. A method as in claim 24 including inputting a speech signal representing a plurality of words one after another, and forming said long term average over all of said words.

34. Apparatus for speaker recognition, said apparatus comprising:

means for generating from a speech signal, a plurality of feature data comprising a series of coefficient sets, each set comprising a plurality of coefficients indicating the short term spectral magnitude in a plurality of frequency bands, said frequency bands being unevenly spaced along the frequency axis;

means for deriving a long term average spectral magnitude of at lest one of said coefficients;

means for normalizing the or each of said at least one coefficient by said long term average;

means for comparing said feature data with predetermined speaker reference data; and means for indicating recognition of a corresponding speaker in dependence upon said comparison.

35. Apparatus as in claim 34 wherein the frequency bands are spaced on a mel-frequency scale.

36. Apparatus as in claim 34 in which the frequency bands are spaced linearly for frequencies below a predetermined limit and logarithmically for frequencies above said limit.

37. Apparatus as in claim 34 wherein the means for generating said coefficients include means to: generate a logarithm of said magnitude, generate a logarithmic long term average value and subtract the logarithmic long term average from the logarithmic coefficient magnitude.

38. Apparatus as in claim 34 wherein means for comparing is arranged to time-align the feature data with the reference data.

39. Apparatus as in claim 38 in which the means for comparing employs a Dynamic Time Warp process.

40. Apparatus as in claim 34 further comprising:

means for recognizing a start point and an end point within said speech signal, in which aid means for normalizing is arranged to derive said long term average over the duration of the utterance between said start point and said end point.

41. Apparatus as in claim 34 wherein the long term average comprises the long term mean.

42. Apparatus as in claim 34 wherein said long term average comprises a moving average which is periodically updated.

43. Apparatus as in claim 34 arranged for inputting a speech signal representing a plurality of words one after another, in which said means for normalizing is arranged to form said long term average over all of said words.

44. Apparatus as in claim 34 adapted to be connected to a telephone network.

45. A telephone network comprising apparatus as in claim 44.

46. Apparatus for recognition processing of a voice signal, said apparatus comprising:

means for deriving recognition data comprising a plurality of signals each related to the short term amplitude in a corresponding frequency band of said voice signal, said frequency bands being unevenly spaced in the frequency domain;

means for periodically generating or updating a moving long term average spectral amplitude in said frequency bands, means for processing said feature data using said long term average to reduce their dependence upon stationary spectral envelope components; and means for performing recognition processing in dependence thereon.

47. A method of speaker recognition comprising:

generating recognition feature data from an input speech signal, comparing said feature data with predetermined speaker reference data; and indicating recognition of a speaker in dependence upon the comparison;

wherein said recognition feature generating step comprises;

identifying a portion of the input speech signal as representing a single contiguous utterance;

generating a plurality of coefficients each relating to the signal magnitude in one of a plurality of predetermined frequency bands of an identified portion of the signal, said frequency bands being unevenly spaced in the frequency domain;

deriving a long term average spectral magnitude of the coefficients of the single contiguous utterance; and processing at least one of said coefficients so as to generate a normalized coefficient in which the effect of said long term magnitude is substantially reduced.

48. A method as in claim 47 wherein the recognition feature generation step is repeated for each successive single contiguous utterance in isolation.

49. A method as in claim 47 wherein said long term average comprises a running average which is periodically updated.

* * * * *